O. W. FOSTER.
GAS ABSORBER.
APPLICATION FILED MAR. 7, 1919.
1,319,274.
Patented Oct. 21, 1919.
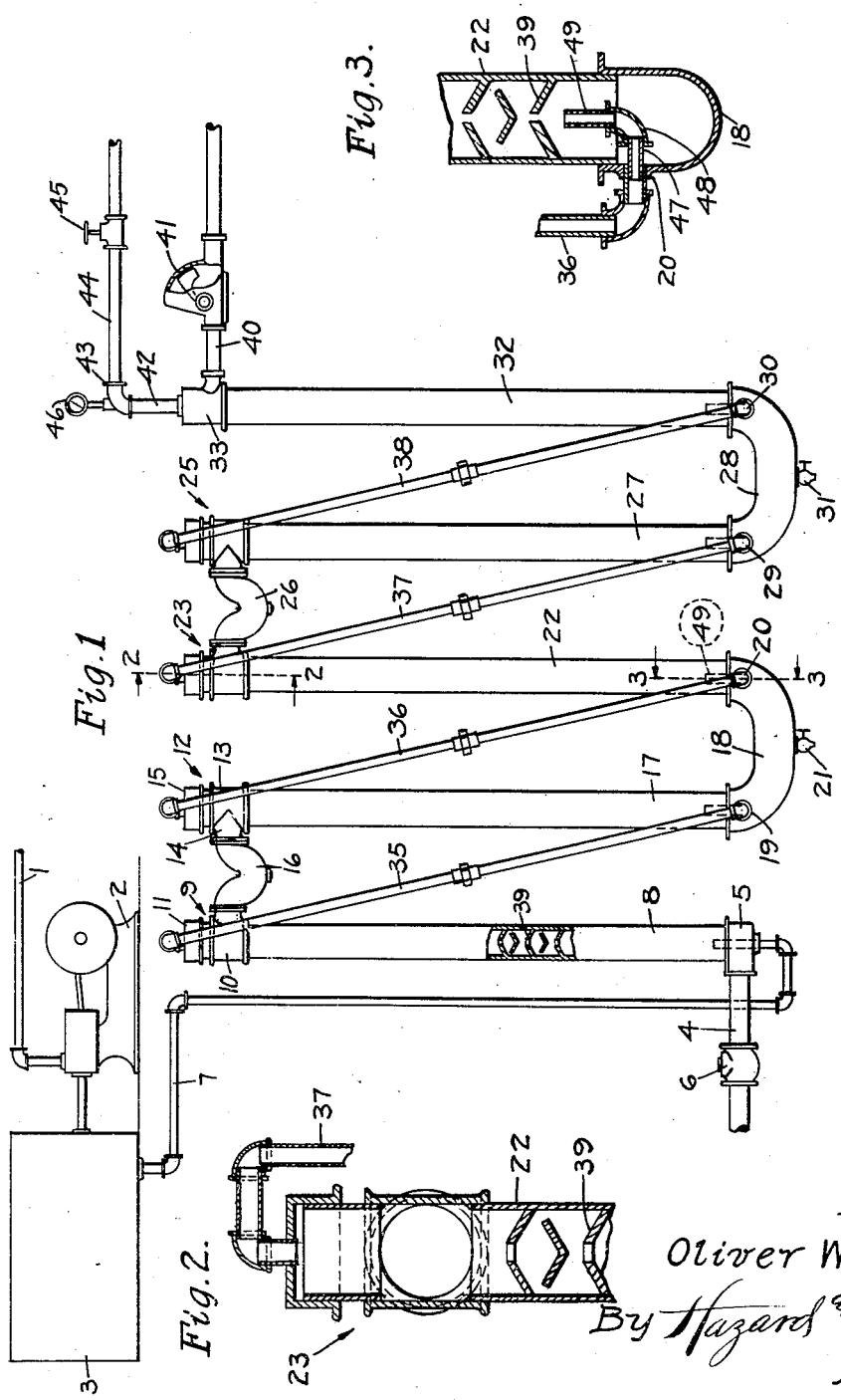
Inventor:
Oliver W. Foster,
By Hazard & Miller
Att'ys.

UNITED STATES PATENT OFFICE.

OLIVER W. FOSTER, OF LOS ANGELES, CALIFORNIA.

GAS-ABSORBER.

1,319,274.　　　　　　Specification of Letters Patent.　　　Patented Oct. 21, 1919.

Application filed March 7, 1918. Serial No. 220,950.

*To all whom it may concern:*

Be it known that I, OLIVER WILLIAM FOSTER, a citizen of the United States, residing at Los Angeles, in the county of Los Angeles and State of California, have invented new and useful Improvements in Gas-Absorbers, of which the following is a specification.

My object is to make a gas absorber for introducing gas into crude oil or the like to increase the fluidity of the oil and to increase the production of gasolene or motor fuel from the oil.

Gas absorbers whereby gas and the like are introduced and agitated in the oil intermittently are known in the art, but the special object of this invention is to construct an apparatus whereby the agitation and absorption is carried on by a continuous process.

Figure 1 is a diagrammatic view of a gas absorber embodying the principles of my invention.

Fig. 2 is an enlarged sectional detail on the line 2—2 of Fig. 1.

Fig. 3 is an enlarged sectional detail on the line 3—3 of Fig. 1.

The gas supply pipe 1 is connected to the air compressor 2 and the air compressor 2 discharges into the gas accumulator 3. The horizontal oil supply pipe 4 leads to a T 5, the flow of oil being controlled by a check valve 6 in the pipe 4. The gas pipe 7 leads from the accumulator 3 downwardly and upwardly vertically through one leg of the T 5 and upwardly beyond the opposite leg of the T. The mixing pipe 8 extends straight up from the T 5, the upper end of the pipe 7 discharging into the lower end of the pipe 8 and the pipe 8 being much larger than the pipe 7. A separating cap 9 is fixed upon the upper end of the pipe 8, said cap 9 comprising a T 10 having an oil outlet and a pipe cap 11 having a gas outlet, the gas outlet being on a higher plane than the oil outlet.

A second separating cap 12 comprises a T 13 having an oil inlet 14, and a pipe cap 15 having a gas outlet, the gas outlet being on a higher plane than the oil inlet. A horizontal trap-shaped pipe 16 connects the outlet of the T 10 to the inlet of the T 13. A second mixing pipe 17 extends downwardly from the cap 12 and a return bend 18 is connected to the lower end of the pipe 17, said return bend having gas inlets 19 and 20 and a drain cock 21.

A third mixing pipe 22 extends upwardly from the other end of the return bend 18 and a third separating cap 23 is fixed upon the upper end of the pipe 22.

A fourth separator cap 25 is connected to the cap 23 by a trap-shaped pipe 26 and a fourth mixing pipe 27 extends downwardly from the cap 25. A second return bend 28 is connected to the lower end of the pipe 27 and has gas inlets 29 and 30 and a drain cock 31.

A fifth mixing pipe 32 extends upwardly from the other end of the return bend 28 and a fifth separator cap 33 is fixed upon the upper end of this pipe 32.

Gas pipes 35 and 36 connect the outlets of the caps 9 and 12 to the inlets 19 and 20, respectively, and similar pipes 37 and 38 connect the caps 23 and 25 to the inlets 29 and 30, respectively.

Each of the mixing pipes 8, 17, 22, 27 and 32 is provided with upwardly inclined oppositely arranged overlapping baffles 39.

An oil pipe 40 extends horizontally from the cap 33 through a gravity regulator 41. It should be noted that pipe 40 is high enough to cause the gas to circulate through the system. A gas pipe 42 extends upwardly from the cap 33 to a T 43 and a gas pipe 44 leads horizontally from the T through a regulating valve 45. A pressure gage 46 is connected to the T 43.

At the lower ends of the gas pipes 35, 36, 37 and 38 inside of the return bends 18 and 28, nipples 47 extend horizontally inwardly, elbows 48 are fixed upon the inner ends of the nipples, and nipples 49 extend upwardly from the elbows at the centers of the mixing pipes 17, 22, 27 and 32, so as to form upwardly discharging nozzles for the gas coming through the gas pipes.

In the practical operation, natural or artificial gas comes through the pipe 1 and is discharged by the air compressor 2 into the accumulator 3 until considerable pressure is developed. The crude oil or the like comes through the pipe 4 under pressure. The oil passes upwardly in the first mixing pipe 8 and the gas passes downwardly through the gas pipe 7 and is discharged upwardly into the lower end of the column of oil and will pass upwardly through the oil. The driving pressure on the gas is greater than the driving pressure on the oil as required to drive the gas through the oil. The oil will absorb a large part of the gas and in this absorption the fluidity of the oil will be increased. The oil will overflow in the separating cap 9 through the outlet in the T 10. The unabsorbed gas will collect in the top of the cap 9 and will flow outwardly through the outlet in the cap 11 and through the gas pipe 35 and be discharged through the nozzle 49 upwardly into the mixing pipe 17. The oil flowing through the pipe 16 into the cap 12 will pass downwardly through the mixing pipe 17 and more gas will be absorbed by this oil. The gas collected in the top of the cap 12 will pass through the pipe 36 and be discharged into the bottom of the mixing pipe 22. The oil passing downwardly through the pipe 17 will pass through the return bend 18 and upwardly through the pipe 22. The oil will overflow from the cap 23 through the pipe 26 to the cap 25 and downwardly through the pipe 27. The gas collected in the top of the cap 23 will flow through the pipe 37 and be discharged upwardly into the lower end of the pipe 27 and the oil will absorb more of the gas. The gas collected in the top of the cap 25 will flow downwardly through the pipe 38 and be discharged upwardly into the lower end of the pipe 32. The oil passing downwardly through the pipe 27 will pass through the return bend 28 and upwardly through the pipe 32 and absorb still more of the gas.

The unabsorbed gas will be separated from the oil in the cap 33 and the saturated oil will pass through the pipe 40 and through the gravity regulator 41 to any suitable storage or receiving means (not shown). The regulator 41 will be set to hold the oil to the desired level. The separated and unused gas will pass upwardly through the pipe 42 through the elbow 43 and through the pipe 44 and through the regulating valve 45 and may be carried to a storage tank or any other suitable means of disposing the gas. The gas pressure will be regulated by the valve 45 and the gage 46 will assist in this regulation.

The oil passing through the regulator 41 will have absorbed a large proportion of the gas and this absorption will greatly increase the fluidity of the oil, making it easier to pump oil through the pipe lines and this absorption of gas will greatly increase the production of gasolene or motor fuel when the oil is refined.

The gas absorber may be used for agitating oil, introducing air and acid and the like.

When the oil is to be treated with a small percentage of acid or the like, the same is introduced in connection with air, which in passing upwardly through the mixing chambers is intermittently mixed with the body of the oil contained therein by means of the baffle plates 39 arranged in said chambers. My apparatus may be used for agitating and mixing any liquid or agent introduced by means of gas.

Various changes may be made in the details of construction without departing from the spirit of my invention as claimed.

I claim:

1. A gas absorber comprising a series of vertical mixing pipes, horizontal trap-shaped pipes connecting the upper ends of the mixing pipes in pairs so as to form a zigzag up and down passage for oil, separator caps at the upper ends of the mixing pipes above the trap-shaped connecting pipes, means for discharging oil under pressure into the bottom of the first mixing pipe, gas pipes connecting the separator caps to the lower ends of the next mixing pipes, and means for driving the gas upwardly through the bottom of the first mixing pipe; so that the oil will flow through the zigzag passage and so that the gas will flow upwardly through the oil in the mixing pipes, the gas passing from one separator cap to the bottom of the next mixing pipe.

2. A gas absorber comprising a series of vertical mixing pipes, traps connecting the upper ends of alternate pairs of the mixing pipes so as to form a zigzag passage up and down for oil, separator caps at the upper ends of the mixing pipes, an oil pipe connected to the lower end of the first mixing pipe, gas pipes connecting the separator caps to the lower ends of the next mixing pipes, an oil pipe extending horizontally from the last mixing pipe, a gravity regulator in the last oil pipe, a gas pipe extending upwardly from the last mixing pipe, a regulating valve in the last gas pipe, a pressure gage connected to the last gas pipe in front of the regulating valve, means for discharging oil into the bottom of the first mixing pipe, and means for discharging gas into the bottom of the first mixing pipe, and driving the gas through the oil.

In testimony whereof I have signed my name to this specification.

OLIVER W. FOSTER.